(12) United States Patent
Lee

(10) Patent No.: US 12,480,171 B2
(45) Date of Patent: Nov. 25, 2025

(54) ULTRA-THICK STRUCTURAL STEEL HAVING EXCELLENT BRITTLE CRACK INITIATION RESISTANCE, AND MANUFACTURING METHOD THEREFOR

(71) Applicant: POSCO, Pohang-si (KR)

(72) Inventor: Hak-Cheol Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 691 days.

(21) Appl. No.: 17/414,064

(22) PCT Filed: Dec. 2, 2019

(86) PCT No.: PCT/KR2019/016840
§ 371 (c)(1),
(2) Date: Jun. 15, 2021

(87) PCT Pub. No.: WO2020/130417
PCT Pub. Date: Jun. 25, 2020

(65) Prior Publication Data
US 2022/0056544 A1 Feb. 24, 2022

(30) Foreign Application Priority Data

Dec. 19, 2018 (KR) .......................... 10-2018-0165448

(51) Int. Cl.
| | |
|---|---|
| C21D 8/02 | (2006.01) |
| C21D 6/00 | (2006.01) |
| C22C 38/00 | (2006.01) |
| C22C 38/04 | (2006.01) |
| C22C 38/08 | (2006.01) |
| C22C 38/12 | (2006.01) |
| C22C 38/14 | (2006.01) |
| C22C 38/16 | (2006.01) |

(52) U.S. Cl.
CPC ............ *C21D 8/0226* (2013.01); *C21D 6/001* (2013.01); *C21D 6/005* (2013.01); *C21D 8/0205* (2013.01); *C22C 38/002* (2013.01); *C22C 38/04* (2013.01); *C22C 38/08* (2013.01); *C22C 38/12* (2013.01); *C22C 38/14* (2013.01); *C22C 38/16* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC .............................. C22C 38/04; C21D 8/0226
See application file for complete search history.

(56) References Cited

U.S. PATENT DOCUMENTS

| | | |
|---|---|---|
| 2013/0292011 A1 | 11/2013 | Kim et al. |
| 2017/0327922 A1 | 11/2017 | Lee et al. |
| 2017/0335424 A1 | 11/2017 | Lee et al. |
| 2017/0342518 A1 | 11/2017 | Lee et al. |
| 2018/0363081 A1 | 12/2018 | Lee et al. |
| 2018/0363107 A1 | 12/2018 | Lee et al. |
| 2019/0093204 A1* | 3/2019 | Lee .......................... C22C 38/14 |

FOREIGN PATENT DOCUMENTS

| | | | |
|---|---|---|---|
| CN | 102691006 A | 9/2012 | |
| CN | 108291287 A | 7/2018 | |
| CN | 108531816 A * | 9/2018 | ............... C21D 1/18 |
| EP | 3385401 A1 | 10/2018 | |
| EP | 3385402 A1 | 10/2018 | |
| JP | 2003-155541 A | 5/2003 | |
| JP | 2009-138255 A | 6/2009 | |
| JP | 2010-095781 A | 4/2010 | |
| JP | 2014-505170 A | 2/2014 | |
| JP | 2018044224 A * | 3/2018 | |
| KR | 10-2014-0098900 A | 8/2014 | |
| KR | 10-2016-0078927 A | 7/2016 | |
| KR | 10-2016-0078928 A | 7/2016 | |
| KR | 10-2016-0079163 A | 7/2016 | |
| KR | 10-1726082 B1 | 4/2017 | |
| KR | 10-1819356 B1 | 1/2018 | |
| WO | WO-2016105064 A1 * | 6/2016 | ............. C21D 8/021 |

OTHER PUBLICATIONS

PE2E translation of CN-108531816-A retrieved on Dec. 13, 2023 (Year: 2018).*
Espacenet machine translation of JP-2018044224-A retrieved on Dec. 13, 2023 (Year: 2018).*
Chinese Office Action dated Dec. 1, 2022 issued in Chinese Patent Application No. 201980084490.0 (with English translation).
"Gorgeous Steel: Blossom Age of Steel," Science and Technology Association of Wuhan Iron and Steel (Group) Company, Metallurgical Industry Press, Sep. 2014, pp. 90-91.
International Search Report and Written Opinion issued in corresponding International Application No. PCT/KR2019/016840 dated Jul. 17, 2020, with English translation.
Extended European Search Report dated Feb. 7, 2022 issued in European Patent Application No. 19900130.6.

(Continued)

*Primary Examiner* — Jophy S. Koshy
*Assistant Examiner* — Joshua S Carpenter
(74) *Attorney, Agent, or Firm* — Morgan Lewis & Bockius LLP

(57) ABSTRACT

One embodiment of the present invention provides an ultra-thick structural steel having excellent brittle crack initiation resistance, and a manufacturing method therefor, the ultra-thick structural steel comprising, by wt %, 0.03-0.08% of C, 1.6-2.2% of Mn, 0.6-1.3% of Ni, 0.005-0.03% of Nb, 0.005-0.02% of Ti, 0.1-0.4% of Cu, 100 ppm or less of P, 40 ppm or less of S, 1.5 ppm or less of H, and the balance of Fe and other inevitable impurities, wherein the sum of acicular ferrite and granular bainite in the microstructure is 80% or more by area fraction, the sum of the total length of cracks having a size of 30 μm or more per unit area of 1 mm2 in a ±1 mm region on the basis of the thickness center of the steel is 130 μm or less, and the yield strength is 500 MPa or more.

8 Claims, No Drawings

(56) References Cited

OTHER PUBLICATIONS

Japanese Office Action dated Sep. 20, 2022 issued in Japanese Patent Application No. 2021-535065.
Zhou Cheng et al., "Microstructure and mechanical properties of EH47 high strength brittle crack arrest steel for container ship", Transactions of Materials and Heat Treatment, vol. 38, No. 08, pp. 89-93, Aug. 2017.
Wang Yanping et al., "Engineering Materials and Their Applications", Southwest Jiaotong University Press, Jul. 2011, p. 110.
Zheng Peiran, "Steelmaking", Metallurgical Industry Press, Jun. 1994, p. 257.
Office Action dated May 28, 2025 issued in corresponding Chinese Patent Application No. 202310965234.9 with English translation. (Note: EP 3385401 A1 already submitted.).

* cited by examiner

ULTRA-THICK STRUCTURAL STEEL HAVING EXCELLENT BRITTLE CRACK INITIATION RESISTANCE, AND MANUFACTURING METHOD THEREFOR

CROSS REFERENCE

This application is the U.S. National Phase under 35 U.S.C. § 371 of International Application No. PCT/KR2019/016840 filed on Dec. 2, 2019, which claims the benefit of Korean Application No. 10-2018-0165448 filed on Dec. 19, 2018, the entire contents of each are hereby incorporated by reference.

TECHNICAL FIELD

The present disclosure relates to a structural ultra-thick steel material having excellent brittle crack initiation resistance and a method of manufacturing the same.

BACKGROUND ART

In recent years, the development of ultra-thick high-strength steel material has been required in terms of design of structures used in domestic and overseas shipbuilding, or the like. When high-strength steel is used in designing structures, such structures may be lightened to obtain economic benefits and a steel sheet may be thinned to simultaneously secure ease of processing and welding operations.

In general, when high-strength steel is manufactured using an ultra-thick steel plate, an overall structure may be insufficiently deformed due to an increase in a total reduction ratio. Therefore, the structure may be coarsened, and a difference between cooling rates of a surface portion and a central portion may occur due to a great thickness in a quenching process, so that a coarse low-temperature transformation phase such as bainite, or the like, may be formed on the surface portion to cause difficulty in securing toughness.

In detail, only existing marine structures have been required to guarantee brittle crack initiation resistance representing the stability of structures. In recent years, there are increasing cases in which even primary structures in the shipbuilding field such as ultra-large ships are required to guarantee brittle crack initiation resistance. However, when a coarse low-temperature transformation phase is generated or an inhomogeneous defect is present in a central portion, brittle crack initiation resistance may be significantly reduced. Therefore, it may be significantly difficult to improve brittle crack initiation resistance of an ultra-thick high-strength steel material.

In addition, in the case of brittle crack initiation resistance, research into ensuring of physical properties of a welded zone has been intensively conducted, but guarantee of brittle crack initiation resistance of a base material itself has recently been increasing. However, when an ultra-thick steel plate is manufactured, the addition of a large amount of alloying elements and a decrease in a reduction ratio may cause significant difficulty in removing defects occurring in a central portion. Due to such residual defects, it may be difficult to guarantee the brittle crack initiation resistance of the base material itself. In addition, such residual defects may reduce the brittle crack initiation resistance of the welded zone.

In the case of an existing ultra-thick high-strength steel material having yield strength of 500 MPa or more, in order to improve brittle crack initiation resistance of a welded zone, efforts were made to refine a microstructure of a heat-affected zone using titanium nitride (TiN) (see Patent Document 1), to form ferrite in a heat-affected zone using oxide metallurgy (see Patent Document 2), or to design and apply low alloy components. Unfortunately, such efforts may be slightly helpful in improving brittle crack initiation resistance of a welded zone, but may not be fundamental countermeasures for residual defects having a main effect on a reduction in brittle crack initiation resistance. Accordingly, there is a need for novel approaches.

RELATED ART DOCUMENTS (Patent Document 1) Japanese Laid-Open Patent Publication No. 2010-095781

(Patent Document 2) Japanese Laid-Open Patent Publication No. 2009-138255

DISCLOSURE

Technical Problem

An aspect of the present disclosure is to provide a structural ultra-thick steel material having excellent brittle crack initiation resistance and a method of manufacturing the same.

Technical Solution

According to an aspect of the present disclosure, a structural ultra-thick steel material having excellent brittle crack initiation resistance includes, by weight %, 0.03 to 0.08% of carbon (C), 1.6 to 2.2% of manganese (Mn), 0.6 to 1.3% of nickel (Ni), 0.005 to 0.03% of niobium (Nb), 0.005 to 0.02% of titanium (Ti), 0.1 to 0.4% of copper (Cu), 100 ppm or less of phosphorus (P), 40 ppm or less of sulfur (S), 1.5 ppm or less of hydrogen (H), and a balance of iron (Fe) and inevitable impurities. A sum of acicular ferrite and granular bainite in a microstructure is 80% or more by area fraction, a sum of total lengths of cracks having a size of 30 μm or more per unit area of 1 mm² in regions of ±1 mm from a thickness center of the steel material is 130 μm or less, and yield strength is 500 MPa or more.

According to another aspect of the present disclosure, a method of manufacturing a structural ultra-thick steel material having excellent brittle crack initiation resistance includes: preparing molten steel including, by weight %, 0.03 to 0.08% of carbon (C), 1.6 to 2.2% of manganese (Mn), 0.6 to 1.3% of nickel (Ni), 0.005 to 0.03% of niobium (Nb), 0.005 to 0.02% of titanium (Ti), 0.1 to 0.4% of copper (Cu), 100 ppm or less of phosphorus (P), 40 ppm or less of sulfur (S), 1.5 ppm or less of hydrogen (H), and a balance of iron (Fe) and inevitable impurities; continuously casting the molten steel to obtain a steel slab; reheating the steel slab to a temperature of 1000 to 1150° C.; rough-rolling the reheated steel slab at a temperature of 900 to 1150° C.; finish-rolling the rough-rolled steel slab at a temperature of Ar3 or more, based on ¼t (where "t" is a thickness of the steel material), to obtain a hot-rolled steel material; and cooling the hot-rolled steel material to a temperature of 300 to 600° C. at a cooling rate of 3° C./sec, The preparing of the molten steel includes RH-refining the molten steel for 15 to 40 minutes.

Advantageous Effects

As set forth above, defects of a central portion of steel may be effectively reduced to provide a structural ultra-thick steel material having excellent brittle crack initiation resistance and a method of manufacturing the same.

BEST MODE FOR INVENTION

Hereinafter, a structural ultra-thick steel material having excellent brittle crack initiation resistance will be described. First, an alloy composition of the present disclosure will be described. The content of the alloy composition described below is represented by weight % (wt %) unless otherwise indicated.

Carbon (C): 0.03 to 0.08%

Since carbon is the most important element in securing basic strength, carbon may be required to be contained in steel within an appropriate range. When the content of carbon is greater than 0.08%, a large amount of martensite-austenite (MA) constituent and a low-temperature transformation phase may be formed in a base material and a heat-affected zone to deteriorate toughness. When the content of carbon is less than 0.03%, strength may be reduced. Therefore, the content of carbon may be within the range of, in detail, 0.03 to 0.08%. A lower limit of the content of carbon may be, in detail, 0.035%, in further detail, 0.037%, and, in yet further detail, 0.04%. An upper limit of the content of carbon may be, in detail, 0.075%, in further detail, 0.07%, and, in yet further detail, 0.065%.

Manganese (Mn): 1.6 to 2.2%

Manganese may be a useful element in improving strength by solid solution strengthening and in improving hardenability to form a low-temperature transformation phase. To satisfy yield strength of 500 MPa to be obtained by the present disclosure, manganese may be added in an amount of 1.6% or more. However, when the content of manganese is greater than 1.5%, formation of upper bainite and martensite may be promoted due to an excessive increase in hardenability to significantly reduce impact toughness and brittle crack initiation resistance. Therefore, the content of manganese may be within the range of, in detail, 1.6 to 2.2%. A lower limit of the content of manganese may be, in detail, 1.65%, in further detail, 1.7%, and, in yet further detail, 1.8%. An upper limit of the content of manganese may be, in detail, 2.15%, in further detail, 2.1%, and, in yet further detail, 2.05%.

Nickel (Ni): 0.6 to 1.3%

Nickel may be an important element for facilitating dislocation cross slip at a relatively low temperature to improve impact toughness and for improving hardenability to increase strength. To improve impact toughness and brittle crack initiation resistance in high-strength steel having a yield strength of 500 MPa, nickel may be added in an amount of, in detail, 0.6% or more. However, when the content of nickel is greater than 1.3%, hardenability may be excessively increased, such that a low-temperature transformation phase may be formed to reduce toughness and to increase manufacturing costs. Therefore, the content of nickel may be within the range of 0.6 to 1.3%. A lower limit of the content of nickel may be, in detail, 0.65%, in further detail, 0.7%, and, in yet further detail, 0.75%. An upper limit of the content of nickel may be, in detail, 1.25%, in further detail, 1.2%, and, in yet further detail, 1.15%.

Niobium (Nb): 0.005 to 0.03%

Niobium may be precipitated in the form of NbC or NbCN to improve strength of a base material. In addition, niobium solid-solubilized during reheating to a high temperature may be significantly finely precipitated in the form of NbC during rolling, such that recrystallization of austenite may be suppressed to refine a structure. To secure such an effect, niobium may be added in an amount of, in detail, at least 0.005%. However, when the content of niobium is greater than 0.03%, brittle cracking may occur in an edge of the steel material and a large amount of MA may be formed in the base material, so that brittle crack initiation resistance may be reduced. Therefore, the content of niobium may be within the range of, in detail, 0.005 to 0.03%. A lower limit of the content of niobium may be, in detail, 0.008%, in further detail, 0.01%, and, in yet further detail, 0.012%. An upper limit of the content of niobium may be, in detail, 0.027%, in further detail, 0.025%, and, in yet further detail, 0.023%.

Titanium (Ti): 0.005 to 0.02%

Titanium is precipitated as TiN during reheating to suppress growth of crystal grains of a base material and a heat-affected zone, so that low-temperature toughness may be significantly improved. To obtain such an effect, titanium may be added in an amount of 0.005% or more. However, when titanium is added in an amount greater than 0.02%, a continuous casting nozzle may be clogged or low-temperature toughness may be reduced by crystallization in a central portion. Therefore, the content of titanium may be within the range of, in detail, 0.005 to 0.02%. A lower limit of the content of titanium may be, in detail, 0.007%, in further detail, 0.08%, and, in yet further detail, 0.01%. An upper limit of the content of titanium may be, in detail, 0.018%, in further detail, 0.016%, and, in yet further detail, 0.014%.

Copper (Cu): 0.1 to 0.4%

Copper may be an important element in improving hardenability and providing solid solution strengthening to increase strength of a steel material, and may also be a main element for increasing yield strength through formation of an upsilon copper precipitate when tempering is applied to the steel material. Therefore, copper may be added in an amount of, in detail, 0.1% or more. However, when the content of copper is greater than 0.4%, cracking of a slab may occur due to hot shortness in a steelmaking process. Therefore, the content of copper may be within the range of, in detail, 0.1 to 0.4%. A lower limit of the content of copper may be, in detail, 0.12%, in further detail, 0.15%, and, in yet further detail, 0.18%. An upper limit of the content of copper may be, in detail, 0.38%, in further detail, 0.35%, and, in yet further detail, 0.32%.

Phosphorus (P): 100 ppm or Less

Phosphorus is an element causing brittleness to occur at grain boundaries or forming coarse inclusions to induce brittleness. To improve brittle crack arrestability, the content of phosphorus may be controlled to be less than 100 ppm or less. The content of phosphorus may be, in detail, 90 ppm or less, in further detail, 80 ppm or less, and, in yet further detail, 60 ppm or less.

Sulfur (S): 40 ppm or Less

Similarly to phosphorus, sulfur is an element causing brittleness to occur at grain boundaries or forming coarse inclusions to induce brittleness. To improve brittle crack arrestability, the content of sulfur may be controlled to be 40 ppm or less. The content of sulfur may be, in detail, 30 ppm or less, in further detail, 20 ppm or less, and, in yet further detail, 10 ppm or less.

Hydrogen (H): 1.5 ppm or Less

When hydrogen is present in a large amount, it may be accumulated in an inclusion, or the like, after cooling is finished and may induce hydrogen-induced cracking (HIC) to cause microcracking. To improve brittle crack initiation resistance, the content of hydrogen may be controlled to be 1.5 ppm or less. The content of hydrogen may be, in detail, 1.3 ppm or less, in further detail, 1.1 ppm or less, and, in yet further detail, 0.9 ppm or less.

A balance of the present disclosure may be iron (Fe). However, in a general manufacturing process, inevitable impurities may be inevitably added from raw materials or an ambient environment, and thus, impurities may not be excluded. A person skilled in the art of a general manufacturing process may be aware of the impurities, and thus, the descriptions of the impurities may not be provided in the present disclosure.

An ultra-thick steel material according to the present disclosure may have a microstructure in which a sum of an area fraction of acicular ferrite and an area fraction of granular ferrite may be, in detail, 80% or more. As described above, in the present disclosure, high strength may be secured by including a mixed structure of acyclic ferrite and granular bainite as a main structure, and high strength may be obtained by first nucleating the acicular ferrite to prevent crystal grains of a bainite phase from becoming coarse. When the sum of the acyclic ferrite and the granular bainite is less than 80 area %, it may be insufficient to obtain the above effect. Therefore, the sum of the acyclic ferrite and granular bainite may be 80 area % or more, in detail, 85 area % or more, in further detail, 90 area % or more, and, in yet further detail, 95 area % or more. A balance microstructure of the ultra-thick steel material according to the present disclosure may be one type or more of upper bainite, a martensite-austenite (MA) constituent, and degenerated pearlite. In the present disclosure, the smaller the balance microstructure, the more preferable. The degenerated pearlite refers to a pearlite structure having a fine size due to a broken lamellar structure.

In the ultra-thick steel material according to the present disclosure, the sum of total lengths of cracks having a size of 30 μm or more per unit area of 1=$^2$ may be 130 μm or less in an area of ±1 mm from a thickness center. As described above, defects occurring in a central portion of the steel material may be suppressed to improve brittle crack initiation resistance of a base material. The sum of the total lengths of the cracks may be, in detail, 110 μm or less, in further detail, 100 μm or less, and, in yet further detail, 90 μm or less.

The ultra-thick steel material provided by the present disclosure may have yield strength of 500 MPa or more. In addition, at a temperature of −10° C., an average crack tip opening displacement (CTOD) value of the base material may be 0.4 mm or more and an impact transition temperature of a central portion may be −40 degrees or less. The ultra-thick steel of the present disclosure may be as, in detail, a structural steel by securing excellent yield strength and brittle crack initiation resistance as described above.

Hereinafter, a method of manufacturing a structural ultra-thick steel material having excellent brittle crack initiation resistance according to an example embodiment of the present disclosure will be described.

Molten steel having the above alloy composition may be prepared. When the molten steel is prepared, the content of hydrogen (H) may be controlled to be 1.5 ppm or less by RH-refining the molten steel for 15 minutes or more. When the RH refining time is less than 15 minutes, it may be difficult to sufficiently reduce hydrogen, so that it may be difficult to improve brittle crack initiation resistance. On the other hand, when the RH refining time is greater than 40 minutes, it may be disadvantageous in terms of economic and costs, as compared with the H reduction effect. Therefore, the RH refining time may be, in detail, 15 to 40 minutes. A lower limit of the RH refining time may be, in detail, 18 minutes, in further detail, 20 minutes, and, in yet further detail, 25 minutes. An upper limit of the RH refining time may be, in detail, 38 minutes, in further detail, 36 minutes, and, in yet further detail, 34 minutes.

Then, the molten steel may be continuously cast to obtain a steel slab. All methods, conventionally used in the art, may be applied to the continuous casting.

The steel slab may be reheated to a temperature of 1000 to 1150° C. The reheating temperature may be, in detail, 1000° C. or more so as to solid-solubilize carbonitride of titanium (Ti) and/or niobium (Nb) formed during casting. Since austenite may be coarsened when the reheating temperature is excessively high, the reheating temperature may be, in detail, 1150° C. or less. Therefore, the reheating temperature may be, in detail, 1000 to 1150° C. A lower limit of the reheating temperature may be, in detail, 1010° C., in further detail, 1030° C., and, in yet further detail, 1050° C. An upper limit of the reheating temperature may be, 1120° C., in further detail, 1100° C., and, in yet further detail, 1080° C.

The reheated steel slab may be rough-rolled at a temperature of 900 to 1150° C. The rough rolling may be performed to adjust a shape of the steel slab. In addition, the rough rolling may be performed to obtain not only an effect of destroying a casting structure of dendrite, or the like, formed by the rough rolling during casting but also an effect of reducing a grain size through recrystallization of coarse austenite. To this end, the rough rolling temperature may be greater than or equal to a temperature Tnr at which recrystallization of austenite stops, for example, may be greater than or equal to 900° C. On the other hand, when the rough rolling temperature is 1150° C. or more, austenite may be coarsened. Therefore, the rough rolling temperature may be, in detail, 900 to 1150° C. A lower limit of the rough rolling temperature may be, in detail, 920° C., in further detail, 930° C., and, in yet further detail, 940° C. An upper limit of the rough rolling temperature may be, in detail, 1100° C., in further detail, 1080° C., and, in yet further detail, 1060° C.

In order to refine a structure through sufficient recrystallization, a total cumulative reduction ratio during the rough rolling may be controlled to be 30% or more. The total cumulative reduction ratio during the rough rolling may be, in detail, 40% or more, in further detail, 45% or more, and, in yet further detail, 50% or more.

The rough-rolled steel slab may be finish-rolled at a temperature of at least Ar3 (ferrite formation temperature) based on ¼t (where "t" is a thickness of a steel material) to obtain a hot-rolled steel. The finish rolling may be performed to change an austenite structure of the rough-rolled steel slab into a deformed austenite structure and to introduce an electric potential therein. When the finish rolling temperature is less than Ar3, a large amount of air-cooled ferrite may be formed in the entire microstructure in a thickness direction to have difficulty in securing yield strength of 500 MPa or more. Therefore, the finish rolling temperature may be Ar3 or more. The finish rolling temperature may be, in detail, Ar3+20° C. or more, in further detail, Ar3+40° C. or more, and, in yet further detail, Ar3+60° C. or more.

To increase brittle crack initiation resistance through refinement of a central microstructure, the total cumulative reduction ratio during the finis rolling may be controlled to be 40% or more. The total cumulative reduction ratio during the finis rolling may be, in detail, 45% or more, in further detail, 50% or more, and, in yet further detail, 53% or more.

The hot-rolled steel may be cooled to a temperature of 300 to 600° C. at a cooling rate of 3° C./sec or more. When the cooling rate during the cooling is less than 3° C./sec or a cooling end temperature is greater than 600° C., yield strength may be 500 MPa or less as the microstructure is softened. When the cooling end temperature is less than 300° C., it may be difficult for hydrogen to escape to the outside after the cooling is finished, so that there is high possibility that microcracking occurs in the center. More specifically, an austenite structure having high solid solubility of hydrogen may be transformed into a microstructure such as acyclic ferrite and granular bainite having low solid solubility of hydrogen by cooling. In this case, the hydrogen may escape outwardly of the steel material. However, when the cooling end temperature is less than 300° C., there is insufficient time for the hydrogen to escape outwardly of the steel material, so that the hydrogen in the steel material. Since the remaining hydrogen acts as a cracking initiation point, the cooling end temperature may be, in detail, 300° C. or more. The cooling rate may be, in detail, 3.1° C./sec or more, in further detail, 3.5° C./sec or more, and, in yet further detail, 3.7° C./sec or more. A lower limit of the cooling end temperature may be, in detail, 320° C., in further detail, 340° C., and, in yet further detail, 360° C. An upper limit of the cooling end temperature may be, in detail, 560° C., in further detail, 530° C., and, in yet further detail, 500° C.

BEST MODE FOR INVENTION

Hereinafter, the present disclosure will be described in more detail through examples. However, it should be noted that the following examples are for illustrative purposes only and are not intended to limit the scope of the present disclosure. The scope of the present disclosure may be determined by matters described in the claims and matters able to be reasonably inferred therefrom.

EMBODIMENT

Molten steel was refined for an RH refining time of Table 1 to prepare molten steel having an alloy composition of Table 1. The prepared molten steel was continuously cast to produce a steel slab having a thickness of 400 mm. The steel slab was reheated to a temperature of 1080° C., and then rough-rolled at a temperature of 1030° C. to prepare a bar having a thickness of 200 mm. A cumulative reduction ratio, applied during the rough rolling, was 50%. After the rough rolling, the bar was finish-rolled within a temperature range of 700 to 850° C. to obtain a hot-rolled steel material having a thickness of Table 2, and then cooled under the conditions listed in Table 2.

A microstructure, yield strength, and an impact transition temperature of a central portion of a steel material manufactured in the above manner were measured, and a measurement result is listed in Table 2. In addition, an overall thickness CTOD test was performed on the steel material, and a test result is listed in Table 2. In addition, regions of ±1 mm from a thickness center of the steel material were each optically imaged 20 times in a length direction of the steel material and a total length of cracks having a length of 30 μm or more per 1 mm$^2$ was calculated, and then a calculation result is listed in Table 2.

TABLE 1

| Steel Type No. | Alloy Composition (weight %) | | | | | | | | | RT (min) |
|---|---|---|---|---|---|---|---|---|---|---|
| | C | Mn | Ni | Cu | Ti | Nb | P (ppm) | S (ppm) | H (ppm) | |
| IS1 | 0.063 | 1.84 | 0.65 | 0.25 | 0.025 | 0.025 | 46 | 12 | 0.9 | 32 |
| IS2 | 0.056 | 1.79 | 0.86 | 0.18 | 0.012 | 0.012 | 63 | 14 | 0.9 | 30 |
| IS3 | 0.039 | 2.12 | 0.96 | 0.26 | 0.017 | 0.019 | 38 | 9 | 0.8 | 37 |
| IS4 | 0.076 | 1.69 | 1.23 | 0.37 | 0.011 | 0.008 | 79 | 11 | 1.1 | 29 |
| IS5 | 0.068 | 1.95 | 1.06 | 0.15 | 0.018 | 0.015 | 57 | 16 | 1.3 | 24 |
| CS1 | 0.11 | 2.11 | 0.86 | 0.31 | 0.014 | 0.019 | 49 | 9 | 1.1 | 27 |
| CS2 | 0.073 | 2.33 | 0.93 | 0.27 | 0.016 | 0.021 | 69 | 23 | 0.9 | 32 |
| CS3 | 0.023 | 1.49 | 0.75 | 0.16 | 0.013 | 0.018 | 51 | 14 | 0.7 | 34 |
| CS4 | 0.089 | 1.98 | 1.43 | 0.49 | 0.021 | 0.027 | 48 | 16 | 0.8 | 31 |
| CS5 | 0.075 | 1.86 | 0.44 | 0.23 | 0.043 | 0.054 | 53 | 18 | 1.2 | 29 |
| CS6 | 0.056 | 1.98 | 0.99 | 0.23 | 0.015 | 0.016 | 46 | 12 | 1.8 | 13 |
| CS7 | 0.068 | 1.86 | 1.12 | 0.32 | 0.017 | 0.019 | 57 | 18 | 2.1 | 12 |

IS: Inventive Steel
CS: Comparative Steel
RT: Refining Time

TABLE 2

| | Steel Type No. | Thn (mm) | CR (° C./s) | CET (° C.) | MS (AF + GB) (area %) | YS (MPa) | LCCP (μm) | ITT (° C.) | CTOD (mm, @ −10° C.) |
|---|---|---|---|---|---|---|---|---|---|
| IE1 | IS1 | 95 | 3.9 | 453 | 89 | 545 | 24 | −53 | 1.89 |
| 1E2 | IS2 | 90 | 4.2 | 503 | 88 | 538 | 11 | −59 | 2.32 |
| 1E3 | IS3 | 100 | 3.6 | 389 | 93 | 571 | 35 | −65 | 1.94 |
| 1E4 | IS4 | 95 | 3.7 | 462 | 87 | 549 | 47 | −72 | 1.52 |
| 1E5 | IS5 | 85 | 4.9 | 552 | 85 | 562 | 117 | −69 | 0.67 |
| CE1 | 1S2 | 90 | 4.6 | 635 | 81 | 485 | 32 | −59 | 1.99 |
| CE2 | 1S5 | 90 | 4.3 | 211 | 77 | 572 | 142 | −38 | 0.29 |
| CE3 | CS | 85 | 4.8 | 432 | 65 | 615 | 79 | −36 | 0.88 |
| CE4 | CS | 100 | 3.2 | 375 | 58 | 523 | 139 | −31 | 0.39 |
| CE5 | CS | 90 | 4.5 | 496 | 49 | 452 | 18 | −59 | 2.11 |
| CE6 | CS | 85 | 4.9 | 435 | 51 | 665 | 145 | −65 | 0.27 |
| CE7 | CS | 90 | 4.3 | 422 | 68 | 645 | 26 | −23 | 0.46 |

TABLE 2-continued

| Steel Type No. | | Thn (mm) | CR (° C./s) | CET (° C.) | MS (AF + GB) (area %) | YS (MPa) | LCCP (μm) | ITT (° C.) | CTOD (mm, @ −10° C.) |
|---|---|---|---|---|---|---|---|---|---|
| CE8 | CS | 95 | 3.7 | 507 | 84 | 595 | 164 | −42 | 0.26 |
| CE9 | CS | 90 | 4.3 | 485 | 87 | 577 | 205 | −32 | 0.12 |

AF: Acicular Ferrite
GB: Granular Bainite
IE: Inventive Example
CE: Comparative Example
IS: Inventive Steel
CS: Comparative Steel
Thn: Thickness
CR: Cooling Rate
CET: Cooling End Temperature
MS: Microstructure
YS: Yield Strength
LCCP: Length of Cracking in Central Portion
ITT: Impact Transition Temperature In the case of Inventive Examples 1 to 5 satisfying alloy compositions and manufacturing conditions proposed in the present disclosure, it may be confirmed that a microstructure in a central portion of a steel material is secured as a mixed phase of 80% or more of acicular ferrite and granular bainite, and the sum of total lengths of cracks having a size of 30 μm or more per unit area of 1 mm$^2$ in regions of ±1 mm from the thickness center of the steel material is 130 μm or less. Accordingly, it may be confirmed that yield strength of 500 MPa or more, an average CTOD value of a base material having 0.4 mm or more, and an impact transition temperature of a central portion of −40° C. or less are secured.

Comparative Example 1 satisfied an alloy composition proposed in the present disclosure, but yield strength thereof was 500 MPa or less as a cooling end temperature exceeded the scope of the present disclosure.

Comparative Example 2 satisfied an alloy composition proposed in the present disclosure, but a cooling end temperature was lower than the range of the present disclosure, so that hydrogen (H) did not sufficiently escape to the outside. Accordingly, a length of a crack in a central portion was greater than 130 μm, and thus, an impact transition temperature of the central portion was greater than −40° C. and Comparative example 2 had a value less than 0.4 mm in a −10° C. CTOD test representing brittle crack initiation resistance.

Comparative Example 3 had a value greater than the range of carbon (C) presented in the present disclosure. Accordingly, a large amount of upper bainite structure was formed due to excessive hardenability, so that an impact transition temperature of a central portion was greater than −40° C.

Comparative Example 4 had a value greater than the range of manganese (Mn) proposed in the present disclosure. Accordingly, a large amount of upper bainite structure was formed due to excessive hardenability, so that an impact transition temperature of a central portion was greater than −40° C. In addition, a large amount of microcracking occurred in a central segregation zone, so that Comparative Example had a value less than 0.4 mm in a −10° C. CTOD test.

Comparative Example 5 had a value smaller than the range of carbon (C) and manganese (Mn) proposed in the present disclosure, so that a large amount of polygonal ferrite and pearlite structures was formed due to insufficient hardenability. As a result, Comparative Example had yield strength 500 MPa or less.

Comparative Example 6 had a value greater than the range of nickel (Ni) and copper (Cu) proposed in the present disclosure, so that a large amount of upper bainite structure was formed due to excessive hardenability. Thus, an impact transition temperature of a central portion was greater than −40° C. In addition, a large amount of microcracking occurred in a central segregation zone, so that Comparative Example 6 had a value less than 0.4 mm in a −10° C. CTOD test.

Comparative Example 7 had a value greater than the range of titanium (Ti) and niobium (Nb) presented in the present disclosure, so that a large amount of upper bainite structure was formed due to excessive precipitate generation and an increase in hardenability. As a result, an impact transition temperature of a central portion was greater than −40° C.

Comparative Examples 8 and 9 had a value greater than the range of hydrogen (H) proposed in the present disclosure, so that a large amount of microcracking occurred in a central portion. As a result, Comparative Examples had value less than 0.4 mm in a −10° C. CTOD test. In particular, in the case of Comparative Example 9, an impact transition temperature of the central portion was greater than −40° C.

The invention claimed is:

1. A structural steel material comprising, by weight %, 0.03 to 0.08% of carbon (C), 1.6 to 2.2% of manganese (Mn), 0.6 to 1.3% of nickel (Ni), 0.005 to 0.03% of niobium (Nb), 0.005 to 0.02% of titanium (Ti), 0.1 to 0.4% of copper (Cu), 100 ppm or less of phosphorus (P), 40 ppm or less of sulfur (S), 1.5 ppm or less of hydrogen (H), and a balance of iron (Fe) and inevitable impurities,
   wherein a sum of acicular ferrite and granular bainite in a microstructure is 80% or more by area fraction,
   a sum of total lengths of cracks having a size of 30 μm or more per unit area of 1 mm$^2$ in regions of ±1 mm from a thickness center of the steel material is 130 μm or less, and
   yield strength is 500 MPa or more.

2. The structural steel material of claim 1, wherein a balance structure of the microstructure is one type or more of upper bainite, a martensite-austenite (MA) constituent, and degenerated pearlite.

3. The structural steel material of claim 1, wherein the steel material has a crack tip opening displacement (CTOD) average value of 0.4 mm or more at a temperature of −10° C., and an impact transition temperature of a central portion of the steel material is −40° C. or less.

4. The structural steel material of claim 1, comprising 0.8 to 1.5 ppm of hydrogen (H).

5. The structural steel material of claim 1, comprising, by weight %, 1.23 to 1.3% of nickel (Ni).

6. A method of manufacturing the structural steel material of claim 1, the method
- preparing molten steel including, by weight %, 0.03 to 0.08% of carbon (C), 1.6 to 2.2% of manganese (Mn), 0.6 to 1.3% of nickel (Ni), 0.005 to 0.03% of niobium (Nb), 0.005 to 0.02% of titanium (Ti), 0.1 to 0.4% of copper (Cu), 100 ppm or less of phosphorus (P), 40 ppm or less of sulfur(S), 1.5 ppm or less of hydrogen (H), and a balance of iron (Fe) and inevitable impurities;
- continuously casting the molten steel to obtain a steel slab;
- reheating the steel slab to a temperature of 1000 to 1150° C.;
- rough-rolling the reheated steel slab at a temperature of 900 to 1150° C.;
- finish-rolling the rough-rolled steel slab at a temperature of Ar3 or higher to obtain a hot-rolled steel material; and
- cooling the hot-rolled steel material to a temperature of 300 to 600° C. at a cooling rate of 3° C./sec or more,
- wherein the preparing of the molten steel includes RH-refining the molten steel for 15 to 40 minutes.

7. The method of claim 6, wherein a total cumulative reduction ratio during the rough-rolling is 30% or more.

8. The method of claim 6, wherein a total cumulative reduction ratio during the finish-rolling is 40% or more.

* * * * *